Patented Nov. 13, 1951

2,575,041

UNITED STATES PATENT OFFICE 2,575,041

PRODUCTION OF ESTERS OF N-ETHANOL MORPHOLINE

Emile Bauer, Valence-sur-Rhone, France, assignor to Jeanne, Sophie Barnier, Valence-sur-Rhone (Drome), France No Drawing. Application July 30, 1947, Serial No. 764,910. In France May 23, 1947

2 Claims. (Cl. 260—247.2)

This invention relates to a method for producing morpholines of the general formula:

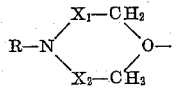

in which formula R designates a radical with long hydrocarbon chains, such as an aliphatic, aromatic, or cycloaliphatic radical substituted or not substituted, connected directly with the nitrogen atom or connected therewith through the agency of an amide, ether or ester group, while $X_1$ and $X_2$ represent each one $CH_2$ group. The inventor has found, what is very surprising, that aminoalcohols with a long hydrocarbon chain of the general formula:

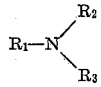

in which formula $R_1$ designates a heavy radical with a hydrocarbon chain having more than 12 atoms of carbon, while $R_2$ and $R_3$ are hydroxylic chains of alkylolamine, particularly the ethoxylic radical, if directly esterified and heated at a temperature between 180° and 280° C. lose a further molecule of water, thereby forming morpholines.

The chains of $R_1$ may contain cyclic or aliphatic heteroatoms and may be connected directly to the atom of nitrogen or else to an already existent substituent through the agency of one or more heteroatoms such as ester, ether or amide connections.

I use preferably aliphatic chains containing more than twelve atoms of carbon and more particularly chains containing between 12 and 20 atoms of carbon.

According to my invention, I use advantageously as a starting material di- and triethanolamines which when amidified or esterified with acids of the type disclosed hereinabove or with esters of such acids produce easily substituted amino-alcohols with a long hydrocarbon chain.

When such substituted amino-alcohols with a hydrocarbon chain are heated at a temperature above 180° C. that may reach 280° C. in the presence or absence of any catalyst, either at atmospheric pressure or at a lower pressure or again at a super-atmospheric pressure, it is easy to obtain through elimination of a molecule of water the desired morpholine.

Certain of these products form weak bases that may form salts with acids, preferably organic acids having a low molecular weight, such as formic and acetic acids. They may be peralkylated, arylated or aralkylated and they may be sulphonated or phosphated with a view to improving certain of their properties.

Certain of the products obtained show emulsifying, detergent, wetting, dispersing, softening, bactericidal and insecticidal properties of a very marked character.

The following examples are given out solely by way of an indication without it being possible to bestow a binding sense to such examples as concerns the scope of my invention.

*Example 1.*—1 molecule of oleic acid and one molecule of triethanolamine are heated together between 180 and 200° C. until one molecule of water is eliminated. The base thus obtained is an ester of triethanolamine. This ester is heated between 230 and 260° C. until a further molecule of water is removed which requires about three hours. A morpholine is thus obtained. The salt obtained with formic or acetic acid is an excellent emulsifying agent.

A part of this condensation product is sulphonated with three parts of sulphonic acid at 66° Bé. between 0 and 10° C. The sulphonate is precipitated on ice, decanted and neutralized with caustic soda at 20° Bé. This provides a product having high dispersing and detergent properties.

*Example 2.*—⅓ molecule of castor oil is heated between 180° and 200° C. during three hours with a molecule of triethanolamine. This produces the ricinic ester of triethanolamine which is a weak base that may form a salt with acids.

This ester is heated in presence of 1% of sulphuric acid at 66° Bé. until a further molecule of water is removed. This produces a morpholine that, when transformed into a salt through acetic acid, shows good wetting, dispersing, equalizing and softening properties. A part of the base is admixed with 10% of trichlorethylene. The mixture is sulphonated at freezing point with three parts of sulphuric acid at 66° Bé. The sulphonate is poured on to ice, decanted and neutralized with caustic soda at 20° Bé. The product thus obtained shows good wetting properties while being altogether stable with reference to water hardening agents.

*Example 3.*—A molecule of oleic acid and a molecule of diethanolamine are heated together between 170 and 190° C. up to elimination of a molecule of water. The condensation result is an amide. When heated between 230 and 260° C. in the presence of 1% of sulphonamic acid under a pressure of 50 mm. of mercury, said product loses a further molecule of water and forms a morpholine. The product obtained is now admixed with 50% of trichlorethylene. A part of this mixture is sulphonated with two parts of sulphuric acid at 46° Bé. between 0 and 10° C. When the product is entirely water-soluble, the sulphonated substances are poured onto ice, the residuary acids are decanted and the sulphonated substances are neutralized by soda at 20° Bé. The trichlorethylene is evaporated in a low vacuum. The resulting product shows excellent emulsifying, detergent and dispersing properties.

Example 4.—One molecule of abietic acid and one molecule of triethanolamine are heated together between 180 and 200° C. in presence of 2% of sulphuric acid under a pressure of 50 mm. of mercury, a molecule of water is eliminated and the abietic ester of triethanolamine is obtained. This ester is a weak base that may be transformed into a salt by an organic acid, so as to produce an easily soluble salt. I continue heating the base between 230 and 260° C. up to elimination of a further molecule of water. The product thus obtained, transformed into a salt of formic acid, shows excellent emulsifying and washing properties.

Example 5.—A molecule of the methylic ester of lauric acid is heated with a molecule of triethanolamine between 180 and 200° C. during three hours. I obtain thus the ester of triethanolamine. This product is heated between 230 and 260° C. in presence of 1% of butylnaphthalene sulphonic acid up to elimination of one molecule of water. The morpholine thus prepared is a weak base that is peralkylated with a molecule of di-methyl sulfate between 70 and 80° C. while maintaining the medium in an alkaline state through incorporation of an aqueous solution of soda carbonate. After total introduction of the sulphate of di-methyl, the mixture is again stirred during one hour between 70 and 80° C. The product obtained is a high grade detergent and emulsifying agent.

Example 6.—A molecule of elaidic acid is heated with a molecule of triethanolamine between 180 and 200° C. up to elimination of a molecule of water. The product thus obtained is an ester of triethanolamine and a weak base that when transformed into a salt by an organic acid with a low molecular weight, sulphonated or peralkylated, provides already products of a high interest as softening, emulsifying and the like agents.

This base heated between 230 and 260° C. during three hours loses a molecule of water and is transformed into a morpholine which is a weak base. The products obtained through salification, sulphonation or peralkylation of this novel base have properties far superior to those obtained when starting from the original base.

A molecule of this novel base is neutralized with sulphuric acid at 66° Bé. and is then sulphonated with two molecules of aceto-sulphuric acid at 20° C. during one hour. The product is precipitated on ice, the residuary acids are removed and neutralization is performed with caustic soda at 20° Bé. up to obtention of a pH value of 10.

The product thus obtained is entirely soluble in a neutral or alkaline medium. It precipitates when in a slightly acid medium. It forms an excellent detergent, dispersing and emulsifying agent that is perfectly resistant with reference to water hardening agents.

The product when neutralized with formic acid up to obtention of a pH equal to 4, produces further new substances resisting in acid media and retaining the same properties.

Example 7.—32 parts of chloride of oleic acid are caused to react on 15 parts of triethanolamine. The base thus obtained is heated between 230 and 260° C. during two hours. One molecule of water is eliminated and a morpholine is obtained.

This product, transformed into salt with an acid such as formic or acetic acid provides an excellent emulsifying detergent and dispersing agent.

Obviously the examples of execution of the method described hereinabove have been disclosed only by way of exemplification and by no means as a limitation and any detail modification may be brought thereto without unduly widening thereby the scope of my invention as defined in accompanying claims.

What I claim is:
1. A method for producing morpholines which consists in heating triethanolamine with long chain fatty acids at a temperature from 180° C. to 280° C. in order to form first a condensation product of said triethanolamine with said long chain fatty acid with elimination of one molecule of water, and continuing heating, thereby eliminating an additional molecule of water and forming the morpholine ring.
2. In the method set forth in claim 1 reacting triethanolamine with a long chain fatty acid and containing 12 to 25 carbon atoms.

EMILE BAUER.

REFERENCES CITED

The following references are of record in the file of this patent:

UNITED STATES PATENTS

| Number | Name | Date |
|---|---|---|
| 615,488 | Knorr | Dec. 6, 1898 |
| 1,859,527 | Payman et al. | May 24, 1932 |
| 1,923,179 | Ulrich et al. | Aug. 22, 1933 |
| 2,075,230 | Schatz | Mar. 30, 1937 |
| 2,138,763 | Grover | Nov. 29, 1938 |
| 2,246,264 | Pinkernelle | June 17, 1941 |
| 2,249,518 | Dickey et al. | July 15, 1941 |
| 2,292,824 | De Groote et al. | Aug. 11, 1942 |
| 2,293,494 | De Groote | Aug. 18, 1942 |
| 2,312,135 | Ulrich et al. | Feb. 23, 1943 |
| 2,334,852 | Weisberg et al. | Nov. 23, 1943 |

FOREIGN PATENTS

| Number | Country | Date |
|---|---|---|
| 364,104 | Great Britain | Dec. 28, 1931 |